(12) United States Patent
Topliss et al.

(10) Patent No.: US 8,830,335 B2
(45) Date of Patent: Sep. 9, 2014

(54) SMA ACTUATION APPARATUS

(75) Inventors: Richard Topliss, Trumpington (GB);
Andrew Benjamin David Brown, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 232 days.

(21) Appl. No.: 13/581,150

(22) PCT Filed: Feb. 28, 2011

(86) PCT No.: PCT/GB2011/000272
§ 371 (c)(1),
(2), (4) Date: Sep. 19, 2012

(87) PCT Pub. No.: WO2011/104518
PCT Pub. Date: Sep. 1, 2011

(65) Prior Publication Data
US 2013/0002933 A1      Jan. 3, 2013

(30) Foreign Application Priority Data

| Feb. 26, 2010 | (GB) | ................................. | 1003277.9 |
| Oct. 8, 2010 | (GB) | ................................. | 1017026.4 |
| Nov. 12, 2010 | (GB) | ................................. | 1019126.0 |
| Nov. 17, 2010 | (GB) | ................................. | 1019408.2 |

(51) Int. Cl.
| *H04N 5/228* | (2006.01) |
| *G02B 27/64* | (2006.01) |
| *G03B 3/10* | (2006.01) |
| *H04N 5/225* | (2006.01) |
| *H04N 5/232* | (2006.01) |
| *G02B 7/08* | (2006.01) |
| *G02B 7/00* | (2006.01) |

(52) U.S. Cl.
CPC ................ *G03B 3/10* (2013.01); *H04N 5/2254* (2013.01); *H04N 5/23287* (2013.01); *G02B 7/005* (2013.01); *G02B 7/08* (2013.01); *G02B 27/646* (2013.01)

USPC ...................... 348/208.11; 348/374; 359/554

(58) Field of Classification Search
CPC . H04N 5/2252; H04N 5/2253; H04N 5/2254; H04N 5/23248; H04N 5/23258; H04N 5/2328; H04N 5/23287
USPC .............. 348/208.7, 208.8, 208.11, 373, 374, 348/375, 357; 359/554, 823
See application file for complete search history.

(56) References Cited

U.S. PATENT DOCUMENTS

| 4,930,494 A | 6/1990 | Takehana et al. |
| 4,977,886 A | 12/1990 | Takehana et al. |

(Continued)

FOREIGN PATENT DOCUMENTS

| EP | 1 304 872 A1 | 4/2003 |
| GB | 2280957 A | 2/1995 |

(Continued)

*Primary Examiner* — John Villecco
(74) *Attorney, Agent, or Firm* — Harness, Dickey & Pierce, P.L.C.

(57) ABSTRACT

An SMA actuation apparatus uses SMA actuator wires to move a movable element supported on a support structure, for example to provide optical image stabilization. Eight SMA actuator wires are arranged inclined with respect to a notional primary axis with a pair of the SMA actuator wires on each of four sides around the primary axis. The SMA actuators are connected so that on contraction two groups of four SMA actuator wires provide a force with a component in opposite directions along the primary axis, so that the groups are capable of providing movement along the primary axis. The SMA actuator wires of each group have 2-fold rotational symmetry about the primary axis, so that there are SMA actuator wires opposing each other that are capable of providing lateral movement or tilting.

17 Claims, 11 Drawing Sheets

(56) References Cited

U.S. PATENT DOCUMENTS

| | | | |
|---|---|---|---|
| 5,763,979 A | 6/1998 | Mukherjee et al. | |
| 6,307,678 B2* | 10/2001 | Kosaka et al. | 359/557 |
| 6,574,958 B1 | 6/2003 | MacGregor | |
| 7,663,811 B2* | 2/2010 | Noda et al. | 359/696 |
| 8,073,320 B2* | 12/2011 | Topliss et al. | 396/133 |
| 8,077,411 B2* | 12/2011 | Shyu et al. | 359/823 |
| 8,174,608 B2* | 5/2012 | Hara et al. | 348/357 |
| 8,248,497 B2* | 8/2012 | Tanimura et al. | 348/294 |
| 8,350,959 B2* | 1/2013 | Topliss et al. | 348/374 |
| 8,570,384 B2* | 10/2013 | Brown | 348/208.11 |
| 2003/0079472 A1 | 5/2003 | Hara et al. | |
| 2006/0150627 A1 | 7/2006 | Oohara | |
| 2006/0272328 A1 | 12/2006 | Hara et al. | |
| 2007/0109412 A1* | 5/2007 | Hara | 348/207.1 |
| 2007/0279497 A1 | 12/2007 | Wada et al. | |
| 2008/0198249 A1 | 8/2008 | Tanimura et al. | |
| 2009/0295986 A1 | 12/2009 | Topliss et al. | |
| 2010/0060776 A1* | 3/2010 | Topliss et al. | 348/340 |
| 2010/0074608 A1* | 3/2010 | Topliss | 396/133 |
| 2011/0249131 A1 | 10/2011 | Topliss et al. | |
| 2011/0279916 A1* | 11/2011 | Brown et al. | 359/823 |
| 2012/0019675 A1 | 1/2012 | Brown | |
| 2012/0106936 A1* | 5/2012 | Lim et al. | 396/55 |
| 2012/0224075 A1* | 9/2012 | Lim et al. | 348/208.11 |
| 2013/0222685 A1* | 8/2013 | Topliss et al. | 348/373 |
| 2013/0300880 A1* | 11/2013 | Brown et al. | 348/208.1 |
| 2014/0028906 A1* | 1/2014 | Chen | 348/375 |
| 2014/0055630 A1* | 2/2014 | Gregory et al. | 348/208.2 |

FOREIGN PATENT DOCUMENTS

| | | | |
|---|---|---|---|
| JP | 2007004121 A * | 1/2007 | |
| JP | 2009128736 A * | 6/2009 | |
| JP | 2010286820 A * | 12/2010 | |
| JP | 2011175160 A * | 9/2011 | |
| KR | 2009 0081855 A | 7/2009 | |
| WO | WO-2007/113478 A1 | 10/2007 | |
| WO | WO-2009/027775 A1 | 3/2009 | |
| WO | WO-2010/029316 A2 | 3/2010 | |
| WO | WO 2010029316 A2 * | 3/2010 | |
| WO | WO-2010/089529 A1 | 8/2010 | |
| WO | WO 2013153400 A2 * | 10/2013 | |

* cited by examiner

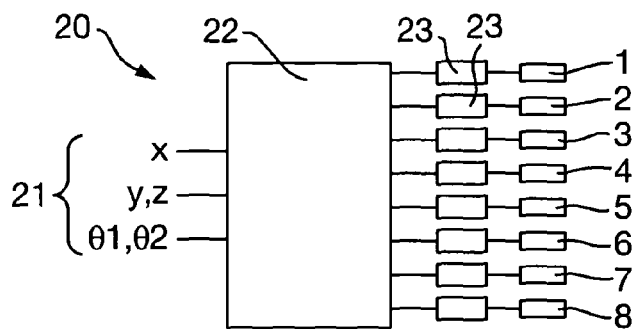
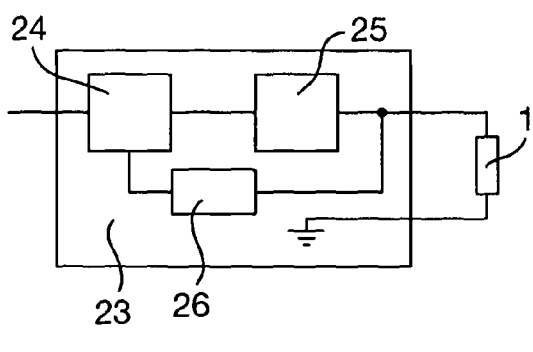
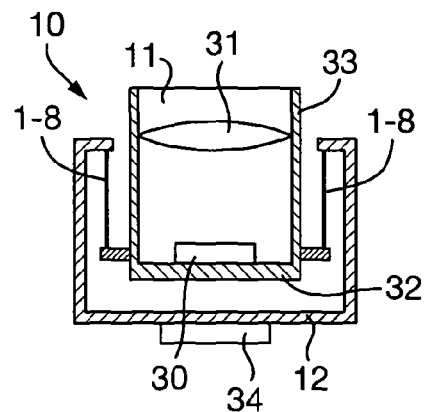
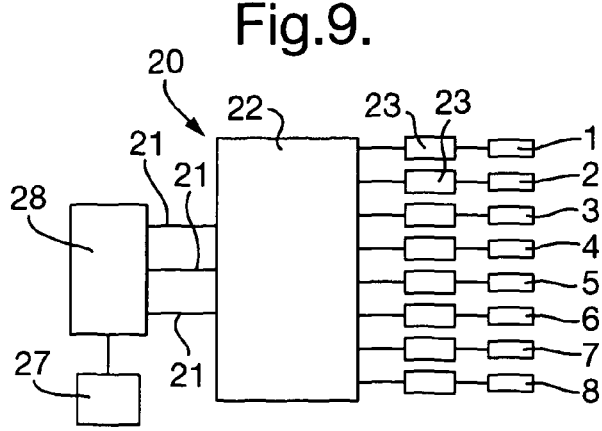
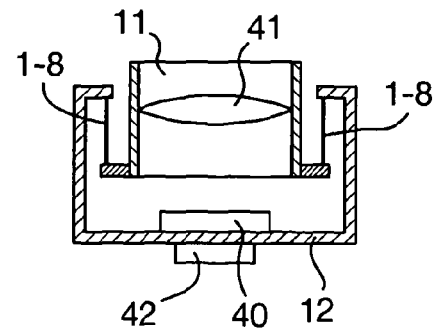

SMA ACTUATION APPARATUS

CROSS-REFERENCE TO RELATED APPLICATIONS

This application is a 371 U.S. National Stage of International Application No. PCT/GB2011/000272, filed on Feb. 28, 2011. This application claims priority to British Patent Application No. 1003277.9, filed on Feb. 26, 2012, British Patent Application No. 1017026.4, filed on Oct. 8, 2010, British patent application No. 1019126.0, filed on Nov. 12, 2010, and British Patent Application No. 1019408.2, filed on Nov. 17, 2010. The contents of the above are herein incorporated by reference in their entirety.

The present invention relates to the use of SMA (shape memory alloy) actuator wires to provide positional control of a movable element supported on a support structure.

There are a variety of types of apparatus in which it is desired to provide positional control of a movable element. SMA wire is advantageous as an actuator in such an apparatus, in particular due to its high energy density which means that the SMA actuator required to apply a given force is of relatively small size.

One type of apparatus in which SMA wire is known for use as an actuator is a camera, particularly a miniature camera. As an example, WO-2007/113478 discloses an SMA actuation apparatus in which SMA actuator wire is used to drive movement of a camera lens element along the optical axis, for example for the purpose of focussing an image formed by the camera lens element on an image sensor. As another example, WO-2010/029316 and WO-2010/089529 each disclose an SMA actuation apparatus in which SMA actuator wire is used to drive to provide optical image stabilisation (OIS) in a camera by driving tilting of a camera unit including a camera lens element and an image sensor. The tilting is controlled to stabilise the image formed by the camera lens element on an image sensor against vibration.

According to a first aspect of the present invention, there is provided an SMA actuation apparatus comprising:

a support structure;

a movable element supported on the support structure in a manner allowing movement of the movable element relative to the support structure; and eight SMA actuator wires inclined with respect to a notional primary axis with a pair of the SMA actuator wires on each of four sides around the primary axis, the SMA actuators being connected between the movable element and the support structure so that on contraction two groups of four SMA actuator wires provide a force on the movable element with a component in opposite directions along the primary axis, the SMA actuator wires of each group being arranged with 2-fold rotational symmetry about the primary axis.

Thus, the SMA actuation apparatus uses eight SMA actuator wires configured in a manner that can provide positional control of the movable element with multiple degrees of freedom. In the most general case, in which the SMA actuator wires are independently driven, then positional control can be provided to move the movable element with all the following degrees of freedom: movement along the primary axis; movement in any arbitrary direction laterally of the primary axis; and tilting in any arbitrary direction. Although in some embodiments driving may optionally be performed in a more restricted manner, in general terms the SMA actuation apparatus provides versatile positional control by selective actuation of different combinations of the SMA actuator wires.

The degrees of freedom in the positional control result from the configuration of SMA actuator wires, as follows.

The two groups of four SMA actuator wires provide a force on the movable element with a component in opposite directions and so common actuation of these groups drives movement along the primary axis. Due to the symmetric arrangement, differential actuation of pairs of the SMA actuator wires within each group drives tilting movement. Further due to the symmetric arrangement, there are pairs of SMA actuator wires that provide a force with a component in directions laterally of the primary axis. Therefore common actuation of the respective pairs drives movement in those lateral directions. Thus selective actuation of these combinations of the SMA actuator wires can be combined to drive the different movements.

In general, the SMA actuation apparatus may be used to provide positional control of a wide range of types of movable element supported on a support structure. Some non-limitative examples within a camera apparatus will now be described.

In one example, the SMA actuation apparatus may be used to provide a camera with OIS by driving movement of a camera unit comprising an image sensor and a camera lens element arranged to focus an image on the image sensor. In this case, the primary axis is the optical axis of the camera lens element. The SMA actuation apparatus may be used to drive tilting of the camera unit in the same manner as disclosed in WO-2010/029316 and WO-2010/089529. In addition, the SMA actuation apparatus may be used to drive movement of the camera unit laterally of the optical axis. The tilting provides stabilisation against blur caused by tilts orthogonal to the optical axis. It has been appreciated that the lateral movement may be used additionally to provide stabilisation against blur caused by tilts around the optical axis. This additional OIS has particular advantage when applied to a miniature camera, in which case the relatively wide angles of the image are particularly susceptible to blur caused by such tilts around the optical axis.

In another example, the SMA actuation apparatus may be used to provide a camera with OIS and with movement of a camera lens element along the optical axis, for example for focussing. In this example, the SMA actuation apparatus is a camera apparatus further comprising an image sensor fixed to the support structure, and the movable element comprises a camera lens element arranged to focus an image on the image sensor. The primary axis is the optical axis of the camera lens element. The SMA actuation apparatus may provide OIS by movement of the camera element laterally of the optical axis, as well as movement of a camera lens element along the optical axis. This is advantageous as it reduces the overall size as compared to a camera in which separate actuation arrangements are used to provide OIS and movement of the camera lens element along the optical axis.

According to a second aspect of the present invention, there is provided an optical image stabiliser for miniature cameras that uses a plurality of independently controlled SMA wires, wherein the electrical power applied to each wire is controlled, and the electrical resistance of each wire is monitored to allow control, wherein the wires also act in concert to sense the tilts applied to the camera module through base excitation, and are controlled to deliver the OIS function without gyroscope sensors by controlling the wires in a manner to reduce the effective resonant frequencies of the camera module being suspended on the SMA wire system.

To allow better understanding, an embodiment of the present invention will now be described by way of non-limitative example with reference to the accompanying drawings, in which:

FIG. 6 is a diagram of a control circuit for the SMA actuation wires;

FIG. 7 is a diagram of the drive circuit of the control circuit;

FIG. 8 is a schematic cross sectional view of an SMA actuation apparatus that is a camera apparatus providing OIS;

FIG. 9 is a diagram of the control circuit adapted for the camera apparatus of FIG. 8 or FIG. 10;

FIG. 10 is a schematic cross sectional view of an SMA actuation apparatus that is a camera apparatus providing OIS and lens movement;

Figure 1:
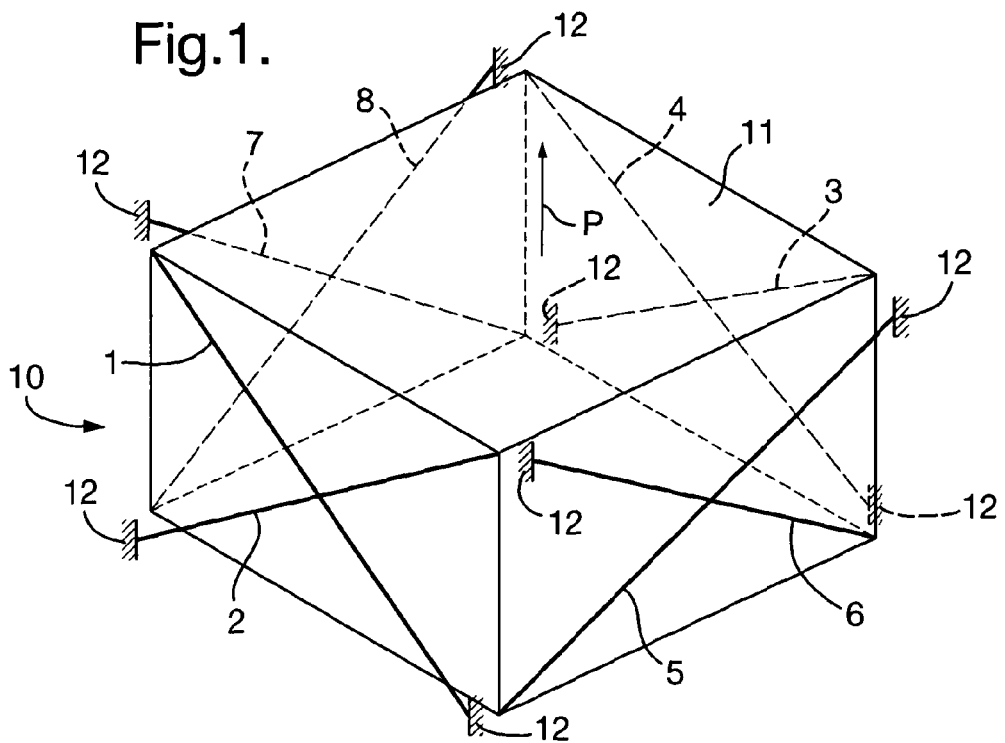
FIGS. 1 to 5 are perspective views of first to fifth arrangements of an SMA actuation apparatus.

Some different arrangements of an SMA actuation apparatus 10 are shown in FIGS. 1 to 5 and will now be described. In each case, a movable element 11 is supported on a support structure 12 by eight SMA actuator wires 1-8. The arrangement of the SMA actuator wires 1-8 varies but common elements have common reference numerals.

The movable element 11 may in general be any type of element. The movable element 11 has a square shape as viewed along a primary axis P but more generally could have any shape. The support structure 12 is illustrated schematically but could in general be any type of element suitable for supporting the movable element 11. The support structure 12 supports the movable element in a manner allowing movement of the movable element 11 relative to the support structure. In the arrangements of FIGS. 1 to 5, the movable element 11 is supported on the support structure 12 solely by the SMA actuator wires 1-8 but in principle the SMA actuation apparatus 10 could comprise a suspension system additionally supporting the movable element 11 on the support structure 12.

Each SMA actuator wire 1-8 comprises a piece of SMA wire connected at each end to a respective one of the movable element 11 and the support structure 12, possibly via an intermediate component. Any suitable means that provides mechanical connection may be used, for example, a crimping member, optionally strengthened by the use of adhesive. In addition, electrical connections are made to the SMA actuator wires 1-8, for example by the crimping member when used.

Each SMA actuator wire 1-8 extends along a side of the primary axis P perpendicular to a notional line radial of the primary axis P and inclined with respect to the primary axis. Each SMA actuator wire 1-8 is held in tension, thereby applying a component of force in a direction along the primary axis P and a component of force in a lateral direction perpendicular to the primary axis P.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 1-8 causes them to decrease in length. The SMA actuator wires 1-8 may be made of any suitable SMA material, for example Nitinol or another Titanium-alloy SMA material. Advantageously, the material composition and pre-treatment of the SMA actuator wires 1-8 is chosen to provide phase change over a range of temperature that is above the expected ambient temperature during normal operation and as wide as possible to maximise the degree of positional control.

On heating of one of the SMA actuator wires 1-8, the stress therein increases and it contracts. This causes movement of the movable element 11. A range of movement occurs as the temperature of the SMA increases over the range of temperature in which there occurs the transition of the SMA material from the Martensite phase to the Austenite phase. Conversely, on cooling of one of the SMA actuator wires 1-8 so that the stress therein decreases, and it expands under the force from opposing ones of the SMA actuator wires 1-8. This allows the movable element 11 to move in the opposite direction.

The position of the movable element 11 relative to the support structure 12 along the optical axis O is controlled by varying the temperature of the SMA actuator wires 1-8. This is achieved by passing through SMA actuator wires 1-8 a drive current that provides resistive heating. Heating is provided directly by the drive current. Cooling is provided by reducing or ceasing the drive current to allow the movable element 11 to cool by conduction to its surroundings.

The first arrangement of the SMA actuation apparatus 10 shown in FIG. 1 is as follows.

Two of the SMA actuator wires 1-8 are arranged on each of four sides around the primary axis P. The two of the SMA actuator wires 1-8 on each side, for example SMA actuator wires 1 and 2, are inclined in opposite senses with respect to each other, as viewed perpendicular from the primary axis P, and cross each other. The four sides on which the SMA actuator wires 1-8 are arranged extend in a loop around the primary axis P. In this example, the sides are perpendicular and so form a square as viewed along the primary axis P, but alternatively the sides could take a different quadrilateral shape. In this example, the SMA actuator wires 1-8 are parallel to the outer faces of the movable element 11 which conveniently packages the SMA actuation apparatus 10 but is not essential.

The two of the SMA actuator wires 1-8 on each side are connected to the movable element 11 and the support structure 12 to provide a force on the movable element 11 with a component in the same direction along the primary axis P, this alternating on successive sides. Thus the SMA actuator wires 1-4 on opposite sides form a group that provide a force in one direction (downwards in FIG. 1) and the SMA actuator wires 5-8 on the other opposite sides form a group that provide a force in the opposite direction (upwards in FIG. 1)

The SMA actuator wires 1-8 have a symmetrical arrangement in which lengths and inclination angles are the same, so that both the group of SMA actuator wires 1-4 and the group of SMA actuator wires 5-8 are each arranged with 2-fold rotational symmetry about the primary axis P (i.e. perpendicular to the SMA actuator wires 1-8 and to the faces of the square shape of the movable element 11). The group of SMA actuator wires 1-4 and the group of SMA actuator wires 5-8 are provided at the same position along the primary axis P.

As a result of this symmetrical arrangement, different combinations of the SMA actuator wires 1-8, when selectively actuated, are capable of driving movement of the movable element 11 with multiple degrees of freedom, as follows.

The group of SMA actuator wires 1-4 and the group of SMA actuator wires 5-8 when commonly actuated drive movement along the primary axis P.

Within each group, the SMA actuator wires on opposite sides (for example on one hand SMA actuator wires 1-2 and on the other hand SMA actuator wires 3-4) when differentially actuated drive tilting about a lateral axis perpendicular to the primary axis P. Tilting in any arbitrary direction may be achieved as a linear combination of tilts about the two lateral axes.

Within each group, the two SMA actuator wires that are parallel (for example on one hand SMA actuator wires 1 and 4 and on the other hand SMA actuator wires 2 and 3) when commonly actuated drive movement along a lateral axis perpendicular to the primary axis P. Movement in any arbitrary direction perpendicular to the primary axis P may be achieved as a linear combination of movements along the two lateral axes.

Figure 2:
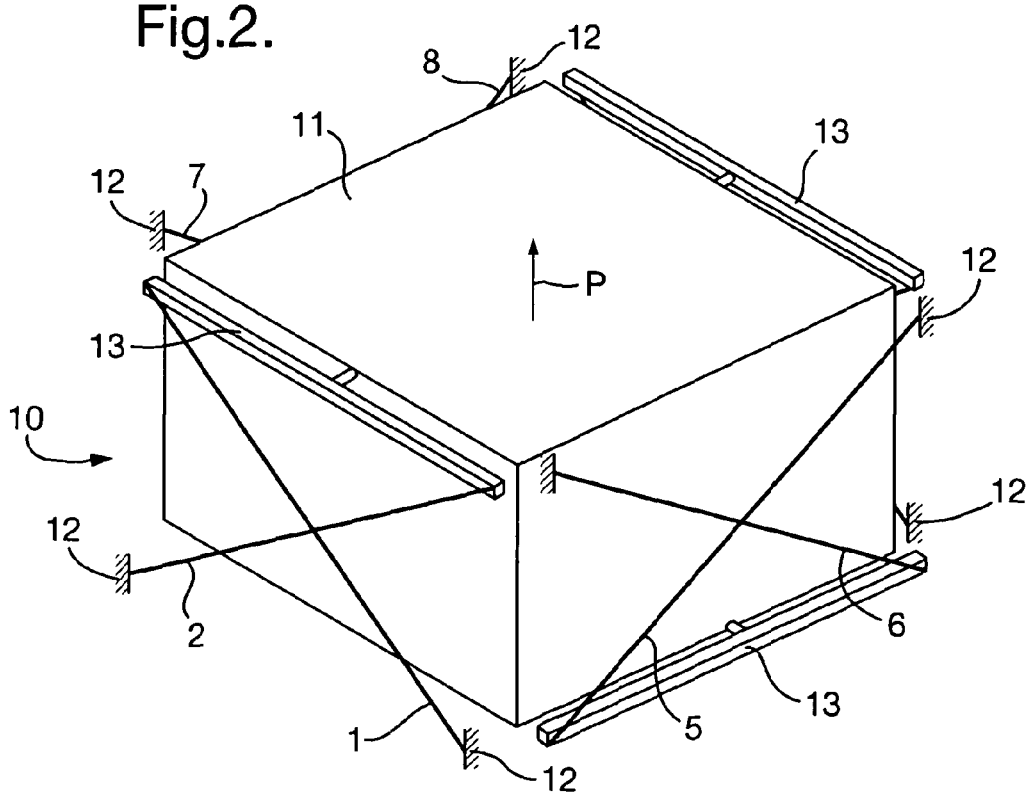

The second arrangement of the SMA actuation apparatus 10 shown in FIG. 2 is arranged as follows. The SMA actuator wires 1-8 have the same configuration as in the first arrangement. However, the SMA actuation apparatus 10 additionally comprises a pivotal member 13 arranged on each side of the movable element. The two of the SMA actuator wires on each side, for example the SMA actuator wires 1-2, are each connected to the pivotal member 13, so that they are connected indirectly to the movable element 11. The pivotal members 13 are each pivotally connected to the movable element 11 at a position midway between the two of the SMA actuator wires 1-8 connected thereto. The pivotal members 13 therefore provide a pivot between two of the SMA wires 1-8 and the movable element 11, thereby allowing one group of SMA actuator wires 1 to 4 (or 5 to 8) to drive tilting of the movable element 11 without interference from the other group SMA actuator wires 5 to 8 (or 1 to 4).

The second arrangement of the SMA actuation apparatus 10 operates in the same manner as the first arrangement.

It is possible to provide other arrangements of the SMA actuator wires 1 to 8 in which two groups driving movement along the primary axis P each have 2-fold rotational symmetry around the primary axis P, for example as follows.

Figure 3:
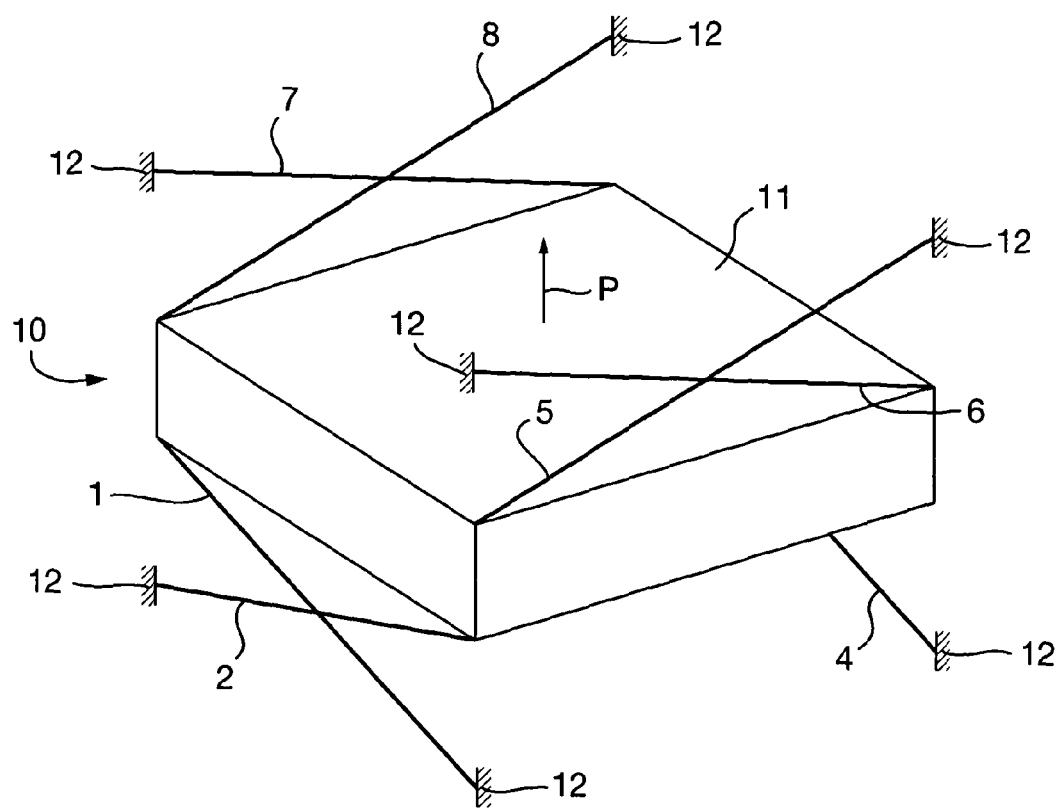

The third arrangement of the SMA actuation apparatus 10 shown in FIG. 3 is the same as the first arrangement, except that the group of SMA actuator wires 1-4 and the group of SMA actuator wires 5-8 are provided at separated positions along the primary axis. The third arrangement of the SMA actuation apparatus 10 operates in the same manner as the first arrangement.

Figure 4:
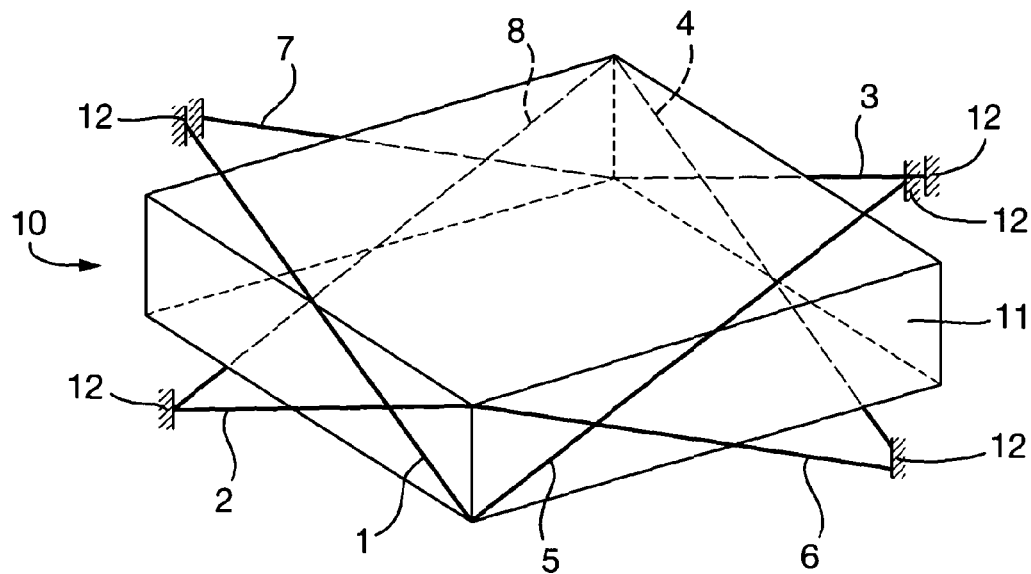

The fourth arrangement of the SMA actuation apparatus 10 shown in FIG. 4 is arranged as follows.

The fourth arrangement includes SMA actuator wires 1-8 arranged on each of four perpendicular sides of the primary axis P in essentially the same positions as in the first arrangement, but differently connected to the movable element 11 and the support structure. Thus, one of the SMA actuator wires 1-8 on each side provides a force on the movable element 11 in the same direction along the primary axis P. In particular, the SMA actuator wires 1, 3, 5, 7 form a group that provide a force in one direction (upwards in FIG. 4) and the other SMA actuator wires 2, 4, 6, 8 form a group that provide a force in the opposite direction (downwards in FIG. 4).

The SMA actuator wires 1-8 have a symmetrical arrangement in which lengths and inclination angles are the same, so that both the group of SMA actuator wires 1, 3, 5, 7 and the group of SMA actuator wires 2, 4, 6, 8 are each arranged with 2-fold rotational symmetry about the primary axis P (i.e. bisecting the angle between SMA actuator wires 1-8 on adjacent sides and across the diagonals of the square shape of the movable element).

As a result of this symmetrical arrangement, different combinations of the SMA actuator wires 1-8, when selectively actuated are capable of driving movement of the movable element 11 with multiple degrees of freedom, as follows.

The group of SMA actuator wires 1, 3, 5, 7 and the group of SMA actuator wires 2, 4, 6, 8 when commonly actuated drive movement along the primary axis P.

Within each group, adjacent pairs of the SMA actuator wires (for example on one hand SMA actuator wires 1, 7 and on the other hand SMA actuator wires 3, 5) when differentially actuated drive tilting about a lateral axis perpendicular to the primary axis P. Tilting in any arbitrary direction may be achieved as a linear combination of tilts about the two lateral axes.

Sets of four SMA actuator wires, including two SMA actuator wires from each group, (for example on one hand SMA actuator wires 1, 2, 7, 8 and on the other hand SMA actuator wires 3-6) when commonly actuated drive movement along a lateral axis perpendicular to the primary axis P. Movement in any arbitrary direction perpendicular to the primary axis P may be achieved as a linear combination of movements along the two lateral axes.

Figure 5:
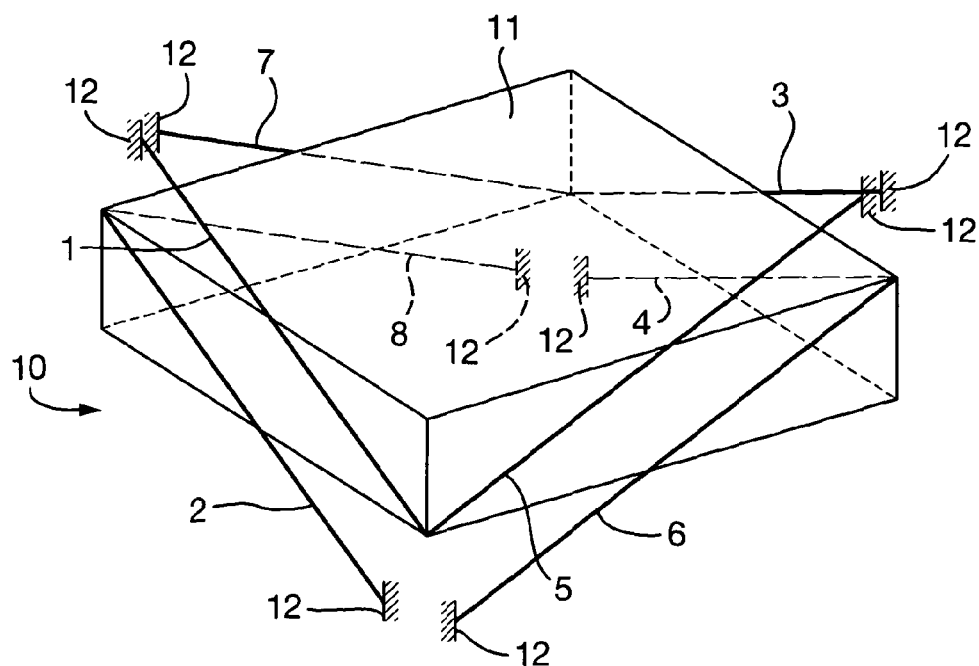

The fifth arrangement of the SMA actuation apparatus 10 shown in FIG. 5 is arranged as follows.

The fifth arrangement is similar to the fourth arrangement except that the inclination of one of the SMA actuator wires 1-8 on each side, that is SMA actuator wires 2, 4, 6, 8, is reversed so that they are parallel to the other one of the SMA actuator wires 1-8 on the same side, that is SMA actuator wires 1, 3, 5, 7.

The fifth arrangement therefore includes the same groups of SMA actuator wires, that is the group of SMA actuator wires 1, 3, 5, 7 and the group of SMA actuator wires 2, 4, 6, 8 that provide forces in directions along the primary axis P when commonly actuated and that provide tilts when differentially actuated in the manner of the fourth arrangement. Similarly, sets of four SMA actuator wires, including two SMA actuator wires from each group, (for example on one hand SMA actuator wires 1, 4, 6, 7 and on the other hand SMA actuator wires 2, 3, 5, 8) when commonly actuated drive movement along a lateral axis perpendicular to the primary axis P. Movement in any arbitrary direction perpendicular to the primary axis P may be achieved as a linear combination of movements along the two lateral axes.

The control of the SMA actuator wires 1-8 will now be discussed further.

A control circuit 20 shown in FIG. 6 generates drive signals for each of the SMA actuator wires 1-8. The control circuit 20 derives the drive signals from the desired movement represented by movement signals 21. One movement signal represents the desired movement x along the primary axis P. Another movement signal represents the desired movements y, z along the lateral axes perpendicular to the primary axis P. Another movement signal represents the desired tilts $\theta_1$, $\theta_2$.

The movement signals 21 are supplied to a matrix controller 22 that may be implemented in a processor or in hardware. The matrix controller 22 generates a control signal for each of the SMA actuator wires 1-8 on the basis of the movement signals 22. This uses a matrix calculation that relates the necessary contraction of each SMA actuator wire 1-8 to achieve movements with each of the degrees of freedom. Thus the matrix calculation represents the actual configuration of the SMA actuator wires 1-8 in the SMA actuation apparatus 10 and is different for each of the first to fifth arrangements described above.

For movements with each of the degrees of freedom, there are sets of the SMA actuator wires 1-8 that on contraction drive movement in opposite directions, as detailed above for each of the first to fifth arrangements. The control signals provide for differential contraction of those sets for each of the movement signals 21. Thus the control signals for two sets of opposing SMA actuator wires in any of the degrees of freedom represented by one of the movement signals 21 are generated to provide a differential displacement in that degree of freedom. Effectively this means that the control signals for those sets have a differential component that is representative of the demanded movement with that degree of freedom.

The differential components representing differential contractions of different sets of the SMA actuators 1-8 arising from movement with different degrees of freedom represented by different movement signals 21 may be added linearly. In this manner, any movement including any of the degrees may be translated into control signals for selectively actuating an appropriate combination of the SMA actuator wires 1-8.

These differential components may be modified by various compensation algorithms to compensate for non-linear effects such as hysteresis in the SMA material.

In addition, the control signals include a common component that represents the desired stress in the SMA actuators 1-8. As respective SMA actuator wires 1-8 apply a stress to each other, this stress can be controlled by varying the heating of the SMA actuator wires 1-8. This provides active control of the stress cycle of the SMA actuator wires 1-8. The SMA actuation apparatus 10 is configured to develop a relatively high stress in the SMA actuator wires 1-8, whilst minimising the stress range. A high stress raises the temperature at which the stress in the SMA material is sufficient to cause contraction. The common component may therefore be varied in response to the ambient temperature, that itself may be determined by a temperature sensor (not shown) or from measured electrical parameters of the SMA actuators 1-8, being increased with increasing ambient temperature. Conversely, keeping the stress range small over a large change in strain has the advantage of minimising fatigue effects. Minimising the stress range also has the effect of minimising the drive power required to change the phase of the SMA material and allow it to contract.

Each SMA actuator wire 1-8 is connected to a respective drive circuit 23 that is supplied by the matrix controller 22 with the control signal for the corresponding SMA actuator were 1-8. The drive circuits 23 generate a drive signal in accordance with the control signal and supply the drive signal to the SMA actuator wire 1-8. The drive circuits 23 have identical arrangement as shown in FIG. 7 of a single SMA actuator wire 1.

The drive circuit 23 includes a drive controller 24 that is supplied with the control signal from the matrix controller 22 and controls a driver 25 using resistance feedback. The drive controller 24 may be implemented in a processor. Although the matrix controller 22 and the drive controllers 24 are illustrated as separate components of ease understanding, they may be implemented in a common processor.

The driver 25 is connected to supply the drive current to the SMA actuator wire 1. The driver 25 may be a constant-voltage current source or a constant-current current source. For example, in the latter case the constant current might be of the order of 120 mA.

The drive circuit 23 further includes a detection circuit 26 arranged to detect the resistance of the SMA actuator wire 1.

In the case that the driver 25 is a constant-current current source, the detection circuit 26 may be a voltage detection circuit operable to detect the voltage across the SMA actuator wire 1 which is a measure of the resistance of the SMA actuator wire 1. In the case that the driver 25 is a constant-voltage current source, the detection circuit 26 may be a current detection circuit. For a higher degree of accuracy the detection circuit 26 may comprise a voltage detection circuit and a current detection circuit operable to detect both the voltage and current across the SMA actuator and to derive a measure of resistance as the ratio thereof.

The drive controller 24 is arranged to control the driver 25 to supply a pulse-width modulated current. The drive controller 24 receives the resistance measured by the detection circuit 26 and uses it as a feedback signal in a closed-loop control algorithm to control the PWM duty cycle of the driver 26 to actuate the SMA actuator 31 in accordance with the demand represented by the overall control signal. The closed-loop control may be proportional.

By using the electrical resistance of the SMA actuator wire 1 as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

Although the SMA actuation apparatus 10 may be used to provide positional control of a wide range of types of movable element 11, some non-limitative examples in which the SMA actuation apparatus is a camera apparatus will now be described.

In a first example, the SMA actuation apparatus 10 is a camera apparatus arranged to perform OIS as shown schematically in FIG. 8 which is a cross-sectional view, the cross-section being taken along the primary axis P that is the optical axis of the camera apparatus. The camera apparatus is to be incorporated in a portable electronic device such as a mobile telephone, media player or portable digital assistant. Thus miniaturisation is an important design criterion.

The movable element 11 is a camera unit that is a functional camera and comprises an image sensor 30 and a camera lens element 31, and the support structure 12 is a camera support on which there is an IC (integrated circuit) chip 34 in which the control circuit 20 is implemented.

The movable element 11 has a printed circuit board (PCB) 32 on its bottom surface to which the image sensor 30 is mounted and connected. The camera lens element 31 is supported by a can 33 on the PCB 32 and arranged to focus an image onto the image sensor 30. The image sensor 30 captures the image and may be of any suitable type for example a CCD (charge-coupled device) or a CMOS (complimentary metal-oxide-semiconductor) device. The camera unit is a miniature camera in which the camera lens element 31 has one or more lenses with a diameter of at most 10 mm.

As described further below, OIS is provided by moving the entire movable element 11 with the advantage that the internal construction of the camera unit need not be adapted for this purpose. Thus, the camera unit may be a functionally standard camera and may have any desired construction to provide the desired optical performance, irrespective of the OIS function, for example comprising a single lens or plural lenses and providing a fixed focus or a variable focus.

In this example, OIS is provided by tilting the movable element 11, but also by moving the movable element 11 along lateral axis perpendicular to the primary axis P that is the optical axis. Thus the SMA actuation apparatus provides advantages over a camera providing OIS solely by tilting. This is based on a recognition that an OIS system for miniature cameras will be used in a different manner to that used for larger digital stills cameras. This observation is currently believed to be unrecognised by the market. Principally, the OIS system for a digital stills camera is used for combating the image shake when taking telephoto images of objects far from the camera. In such circumstances, the tilt of the camera about axes orthogonal to the optical axis are the primary sources of the image shake.

However, for miniature cameras, optical zoom is currently not used, and the images are wide angle (for example typically with a 60 degree field of view). In such circumstances, the wider angles of the image are more susceptible to blur caused by tilts around the optical axis, in addition to those orthogonal to the optical axis. OIS for miniature cameras has an advantage of allowing a longer exposure time to allow better indoor, low light images. This is particularly important for miniature cameras, since the pixels and lens are so small that relatively few photons of light enter the camera and are sensed by the pixels. Therefore, an OIS system has the effect of improving the image quality in low light conditions, and allows a miniature camera to appear "bigger". There are also uses of an OIS system for reducing the shake in the camera's video mode.

Therefore, it is highly advantageous to compensate for tilts in three orthogonal axes (including the optical axis), rather than the normal two. This finding is not currently reflected in customer specifications. However, the SMA actuation apparatus 10 makes use of this finding to provide an actuator arrangement capable of actively compensating for dynamic tilt of the camera in three orthogonal axes.

It should also be noted that for macro images, image blur caused by lateral shift of the camera (as opposed to tilt) could also be significant. There are several ways to combat this, one of which is to sense this lateral shift with accelerometers, and then compensate for it with an induced tilt, which is dependent on the camera's auto-focus status, which provides information about the object distance from the camera. This is because the required tilt to compensate for a lateral shift is dependent on the object distance from the camera.

An alternative is to try and provide an actuation mechanism that is also capable of providing additional degrees of freedom to shift the camera laterally to compensate for these induced linear movements. The SMA actuation apparatus 10 is capable of these extra degrees of freedom.

The control circuit 20 of the SMA actuation apparatus 10 is adapted as shown in FIG. 9 to provide the OIS function.

The control circuit 20 additionally includes a gyroscope sensor 27 that outputs a signal representative of the angular velocity of the movable element 11, thereby acting as a vibration sensor that detects the vibrations that SMA actuation apparatus 10 is experiencing. The gyroscope sensor 27 is typically a pair of miniature gyroscopes, for detecting vibration around two axes perpendicular to each other and the optical axis, as well as around the optical axis, although in general larger numbers of gyroscopes or other types of vibration sensor could be used.

The output signals from the gyroscope sensor 27 are supplied to an OIS controller 28 that may be implemented in a processor. Although the matrix controller 22 and the OIS controller 28 are illustrated as separate components for ease of understanding, they may be implemented in a common processor. The OIS controller 28 derives the movement signals 21 that represent the movement of the movable element 11 needed to compensate for the movement of the SMA actuation apparatus 10 as a whole. This includes movement signals 21 representing desired tilts $\theta 1$, $\theta 2$ and representing desired movements y, z along the lateral axes perpendicular to the primary axis P. In this example, no movement along the primary axis P is needed, so the movement signal 21 representing the desired movement x along the primary axis P is effectively fixed or may be not used.

As the gyroscope sensor 27 is mounted on the support structure 12 the output signals are representative of the vibration of the support structure 12. Such vibration will always be present and OIS is effected by tilting the movable element 11 in opposition. Accordingly, the OIS controller 28 generates movement signals 21 providing a desired movement which is opposite to the actual tilt as measured by the gyroscope sensor 27.

In a second example, the SMA actuation apparatus 10 is a camera apparatus arranged to perform OIS and movement of a lens element along the optical axis, as shown schematically in FIG. 10 which is a cross-sectional view, the cross-section being taken along the primary axis P that is the optical axis. The camera apparatus is to be incorporated in a portable electronic device such as a mobile telephone, media player or portable digital assistant. Thus miniaturisation is an important design criterion.

The support structure 12 is a camera support supporting an image sensor 40 on which there is an IC (integrated circuit) chip 42 in which the control circuit 20 is implemented. The movable element 11 comprises a camera lens element 41 arranged to focus an image onto the image sensor 40. The image sensor 40 captures the image and may be of any suitable type for example a CCD (charge-coupled device) or a CMOS (complimentary metal-oxide-semiconductor) device. The camera apparatus is a miniature camera in which the camera lens element 41 has one or more lenses with a diameter of at most 10 mm.

In this example, OIS is provided by moving the camera lens element 41 laterally of the optical axis. In addition, the camera lens element 41 may be moved along the optical axis, for example to provide focussing. Thus the OIS function and the movement function are combined in the SMA actuation apparatus 10.

In many known arrangements using SMA actuator wire to provide an OIS function, for example as disclosed in WO-2010/029316 and WO-2010/089529, the OIS is provided by tilting the entire camera unit including the lens element and the image sensor, substantially as rigid body. This method of compensating for user handshake does in principle give the best OIS performance, because aligning the lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

Firstly, a miniature camera is typically used in a multifunctional product, such as a mobile phone. In such modern phones, it is increasingly typical to package gyroscopes and accelerometers in the phones to perform various functions, including augmented reality and gaming. It is highly desirable to use one gyro package in the product to perform several functions, including the OIS sensing function. In this way the costs are reduced. Typically, at time of writing, such gyros cost around $2, whereas the OIS actuator mechanism is probably less than this. Therefore, it is highly advantageous not to package the gyro in the camera, but to mount it on the motherboard of the apparatus 10, and so allow for its use for other functions. This reduces the effective added cost of the OIS function in the camera.

Secondly, related to this first point, is that by avoiding packaging the gyro in the phone makes the camera smaller, and allows it to have a square footprint. This makes it easier to swap a camera without OIS for one with OIS in flexible phone architectures. Having concluded that it is commercially desirable to package the gyro 'off-camera', one of the upshots is that the simple closed loop feedback on the camera tilt is lost. This both worsens the OIS performance, but widens the possibilities for the actuator architectures that can be used to deliver the OIS function.

There are three further problems with the camera tilting architecture that the present invention looks to mitigate.

The first problem is that with the 'camera tilt' method, the image sensor is moving, relative to the fixed camera structure. This presents extreme difficulties in routing electrical connections from the image sensor to the fixed structure of the camera, and onto the mobile phone motherboard. Solutions to this centre around flexible printed circuits (FPC's) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimise the camera height.

The third problem, is that by tilting the whole camera, it is difficult to package the tilting actuators without increasing the footprint of the camera over that of the camera without OIS.

Accordingly, in this example, termed the 'lens shift', the lens element is moved linearly in two orthogonal directions, both orthogonal to the optical axis. The resulting image compensation does not entirely reverse the effects of user handshake, but the performance is deemed sufficiently good, given the constraints described above. Furthermore it allows the movement of the lens along the optical axis to be achieved with the same SMA actuation apparatus. This reduces the size, as compared to the use of separate mechanisms for OIS and for movement along the optical axis.

The control circuit 20 of the SMA actuation apparatus 10 is adapted as shown in FIG. 9 to provide the OIS function for this example shown in FIG. 10, as well as the example shown in FIG. 8. However in this case the operation is as follows.

The control circuit 20 additionally includes a gyroscope sensor 27 that outputs a signal representative of the angular velocity of the movable element 11, thereby acting as a vibration sensor that detects the vibrations that SMA actuation apparatus 10 is experiencing. The gyroscope sensor 27 is typically a pair of miniature gyroscopes, for detecting vibration around two axes perpendicular to each other and the optical axis, although in general larger numbers of gyroscopes or other types of vibration sensor could be used.

The output signals from the gyroscope sensor 27 are supplied to an OIS controller 28 that may be implemented in a processor. Although the matrix controller 22 and the OIS controller 28 are illustrated as separate components for ease of understanding, they may be implemented in a common processor. The OIS controller 28 derives the movement signals 21 that represent the movement of the movable element 11 needed to compensate for the movement of the SMA actuation apparatus 10 as a whole. This includes movement signals 21 representing desired movements y, z along the lateral axes perpendicular to the primary axis P. The OIS controller 28 also generates a movement signal representing the desired movement along the optical axis, ie the primary axis P. Depending on the configuration of the lens element 41, this may provide focussing or may change the field of view. This desired movement may be selected by user input. Alternatively, the desired movement may be derived by an auto-focussing algorithm, for example based on the output of the image sensor 40. In this example, no tilting movement is needed so the movement signal 21 representing the desired tilts $\theta 1$, $\theta 2$ is effectively fixed or may be not used.

As the gyroscope sensor 27 is mounted on the support structure 12 the output signals are representative of the vibration of the support structure 2. Such vibration will always be present and OIS is effected by moving the camera lens element 41 in opposition. Accordingly, the OIS controller 28 generates movement signals 21 providing a desired movement which is opposite to the actual tilt as measured by the gyroscope sensor 27.

In both the first and second examples of FIGS. 8 and 10, the SMA actuator wires 1-8 may be provided with a sufficient speed of response to provide OIS. Typically each SMA actuator wire 1-8 is proportionally driven so as to control the position over a frequency bandwidth up to 10 Hz, up to 20 Hz, or up to 30 Hz. A perceived drawback of SMA as an actuator is its slow response time. As an SMA material is thermally driven, the response time is limited by the temperature change achievable, being associated with thermal conductivity, specific heat capacity, and thermal mass.

Whilst heating of the SMA actuator wires 1-8 can be increased by increasing the power of the drive current, cooling is dependent on the thickness of the SMA actuator wires 1-8. This thickness is selected to provide the desired response time during cooling. For example, if the SMA actuator wires 1-8 are of thickness 25 μm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 μm at over 20 Hz). Surprisingly, in spite of the roll-off in SMA wire response above 4 Hz, the SMA actuator wires 1-8 are still able to deliver the displacement requirements at 30 Hz, and so are able to successfully meet the actuation requirements of the OIS for miniature cameras.

Some specific constructions for the SMA actuation apparatus 10 in accordance with this second example will now be described. In each of these constructions, the SMA wires 1-8 are arranged as shown in FIG. 1.

Figure 11:
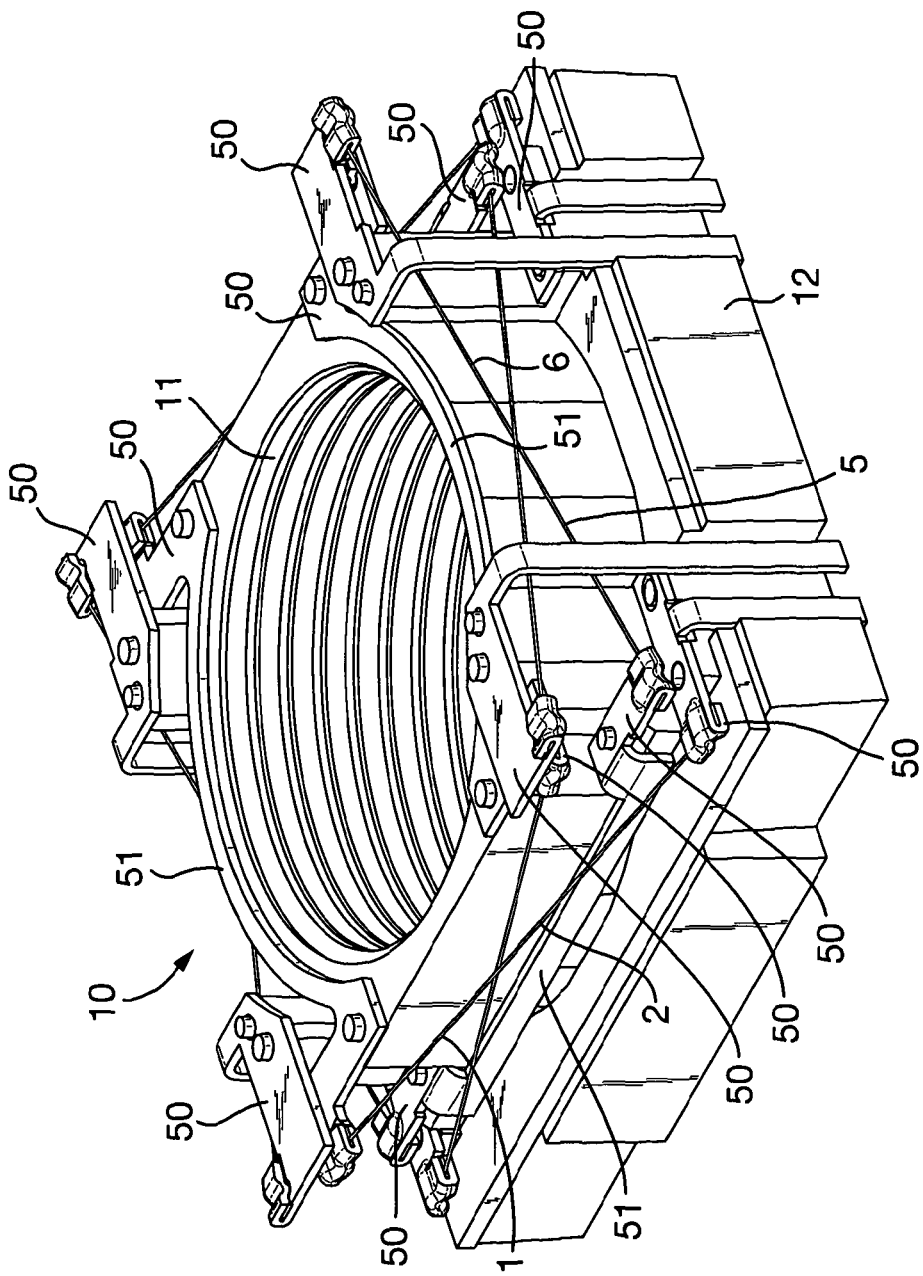
FIG. 11 is a perspective view of a first construction of an SMA actuation apparatus.
Figure 12:
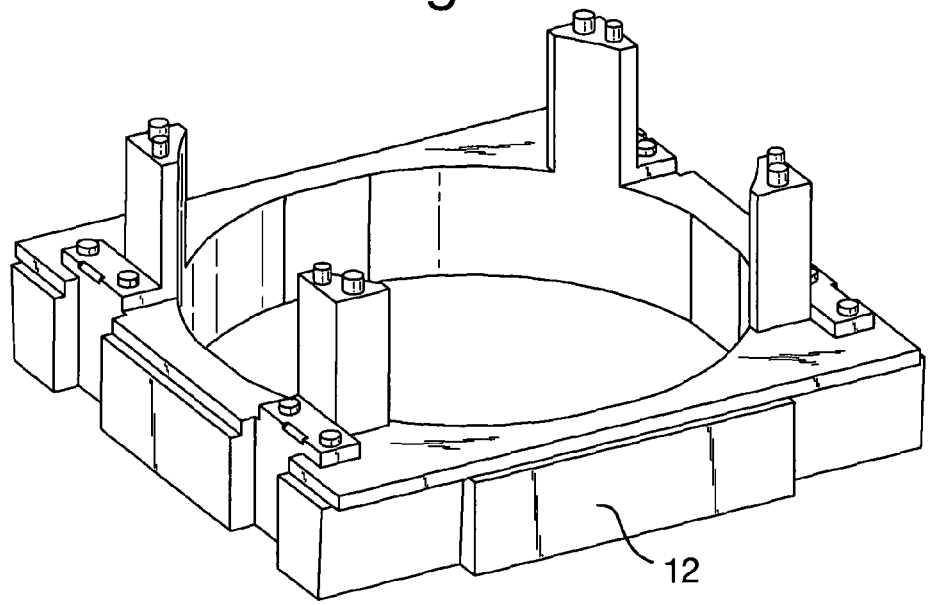
FIG. 12 is a perspective view of a support structure in FIG. 11.
Figure 13:
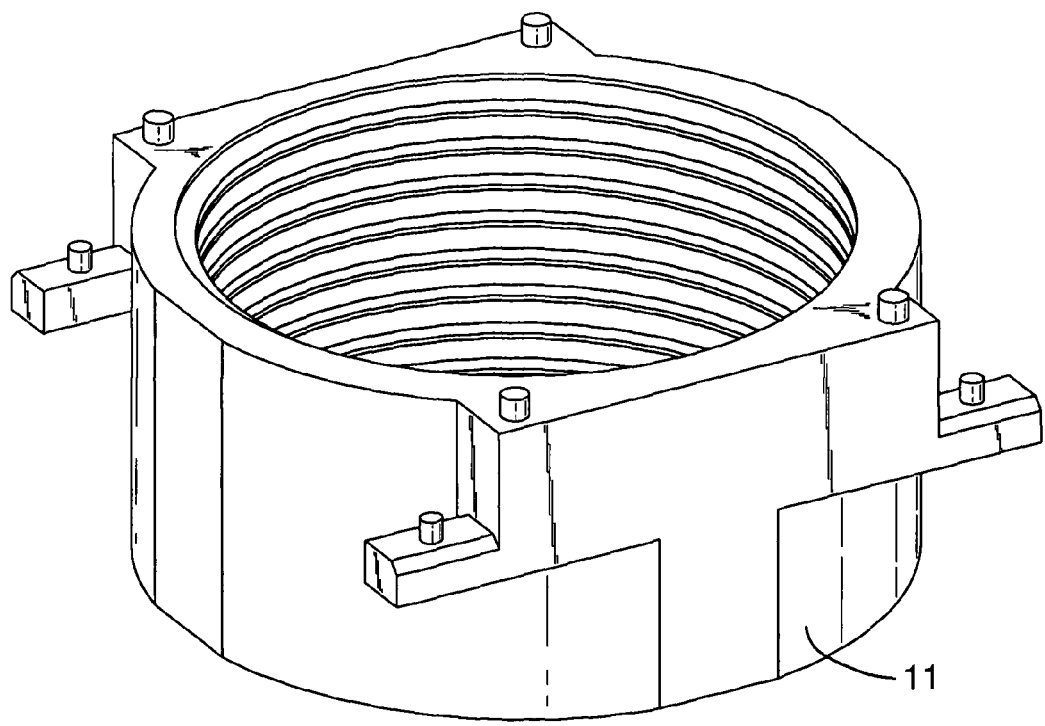
FIG. 13 is a perspective view of a movable element in FIG. 11.

A first construction is shown in FIGS. 11 to 13.

FIG. 11 shows the entire SMA actuation apparatus 10 including the support structure 12 and the movable element 11 which is a lens carriage into which the camera lens element 41 may be screwed, these elements being shown individually in FIGS. 12 and 13.

The SMA actuation wires 1-8 are connected between the support structure 12 and the movable element 11 by crimping members 50 that crimp the SMA actuation wires 1-8 and are fixed to one of the support structure 12 and the movable element 11. The SMA actuation wires 1-8 are the only components suspending the movable element 11 on support structure 12. There are no further flexures or other components in separate linking paths between the support structure 12 and the movable element 11 to allow movable element 11 to move in the three orthogonal linear directions without requiring gimbals and nested support structures, each dealing with one movement direction.

In this second example, as no tilting movement is required, pairs of the SMA actuator wires 1-8 that are parallel to each other on opposite sides of the movable element 11 are connected electrically in series by interconnects 51 extending between the crimps 50. This is possible because in this example no tilting is needed and so these wires are always driven by a common drive signal. This has the advantage of allowing all the electrical connections needed to supply the drive signals from the control circuit 20 to be on the support structure 12 without additional electrical connections on the movable element 11.

As pairs of the SMA actuator wires 1-8 are connected electrically in series, and hence are operated together by the application of a single voltage signal, an alternative is to use four wires rather than eight, but this is not currently preferred because the length of unused wire linking the two lengths of active wire presents control problems, and mechanical assembly and lifetime problems.

A second construction is shown in FIGS. 14 to 20.

Figure 14:
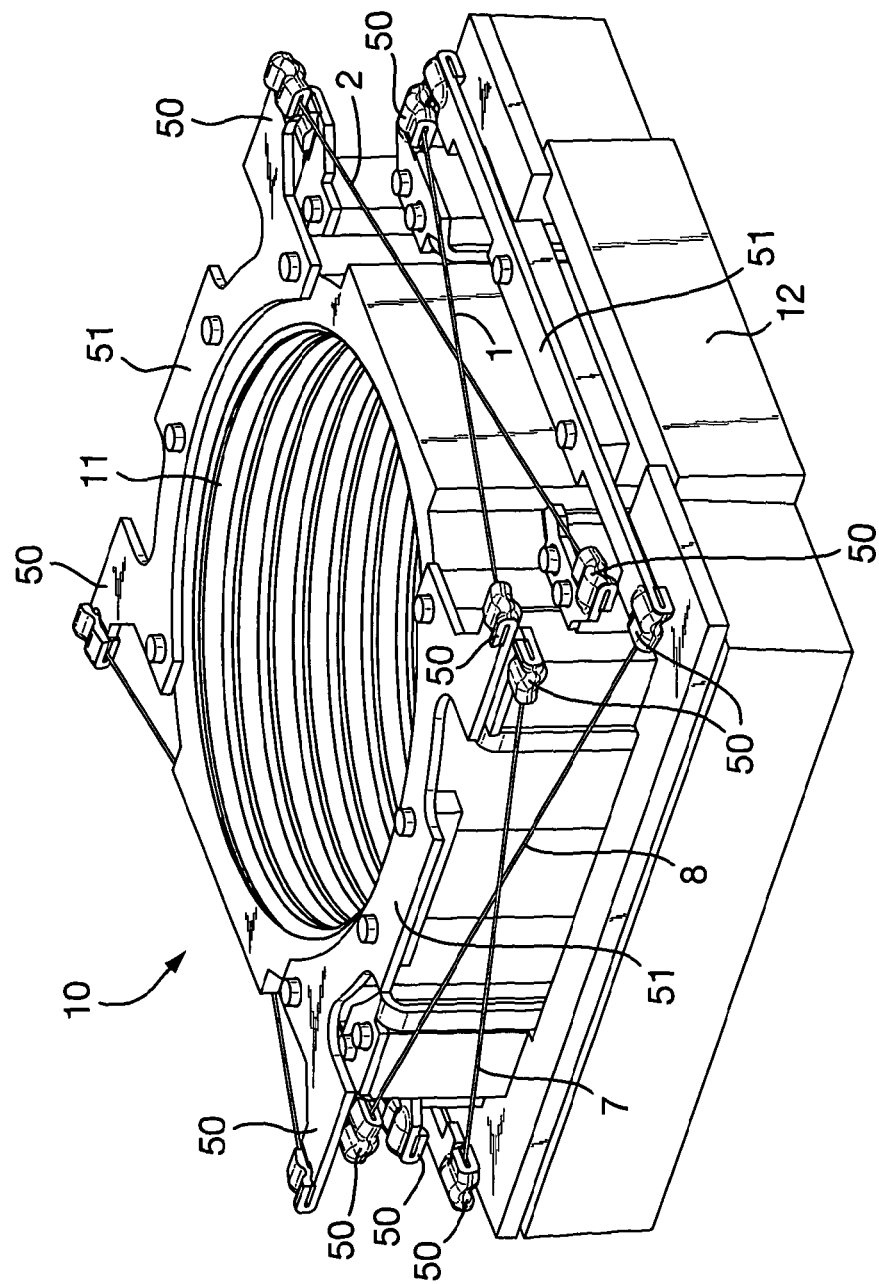
FIG. 14 is a perspective view of a second construction of an SMA actuation apparatus.
Figure 15:
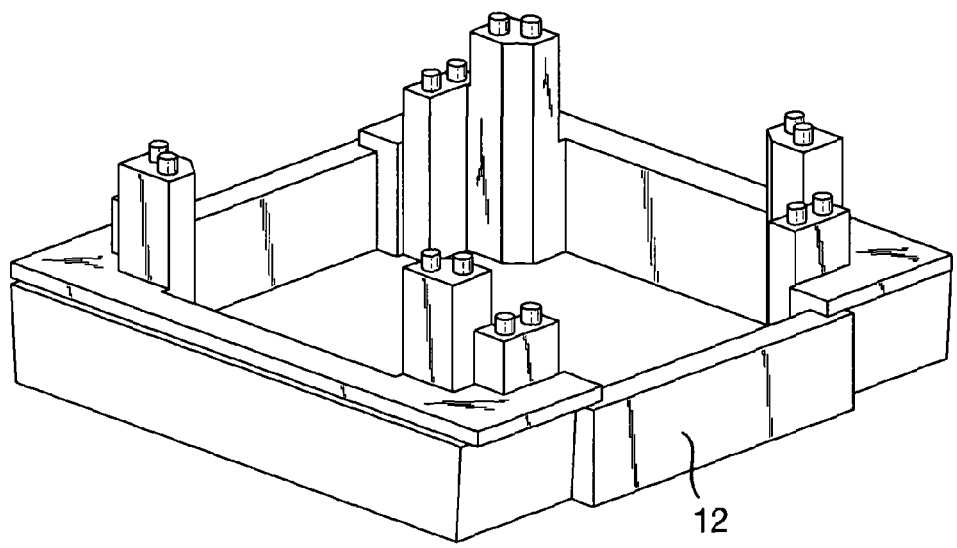
FIG. 15 is a perspective view of a support structure in FIG. 14.
Figure 16:
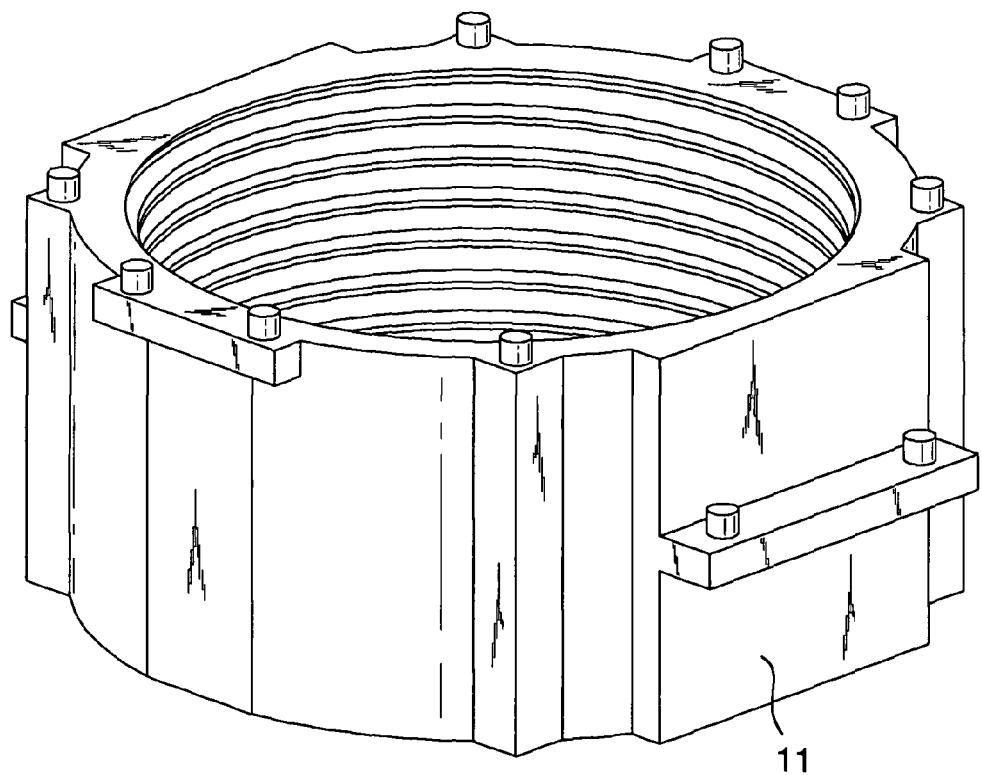
FIG. 16 is a perspective view of a movable element in FIG. 14.

FIG. 14 shows the entire SMA actuation apparatus 10 including the support structure 12 and the movable element 11 which is a lens carriage into which the camera lens element 41 may be screwed, these elements being shown individually in FIGS. 15 and 16.

Figure 17:
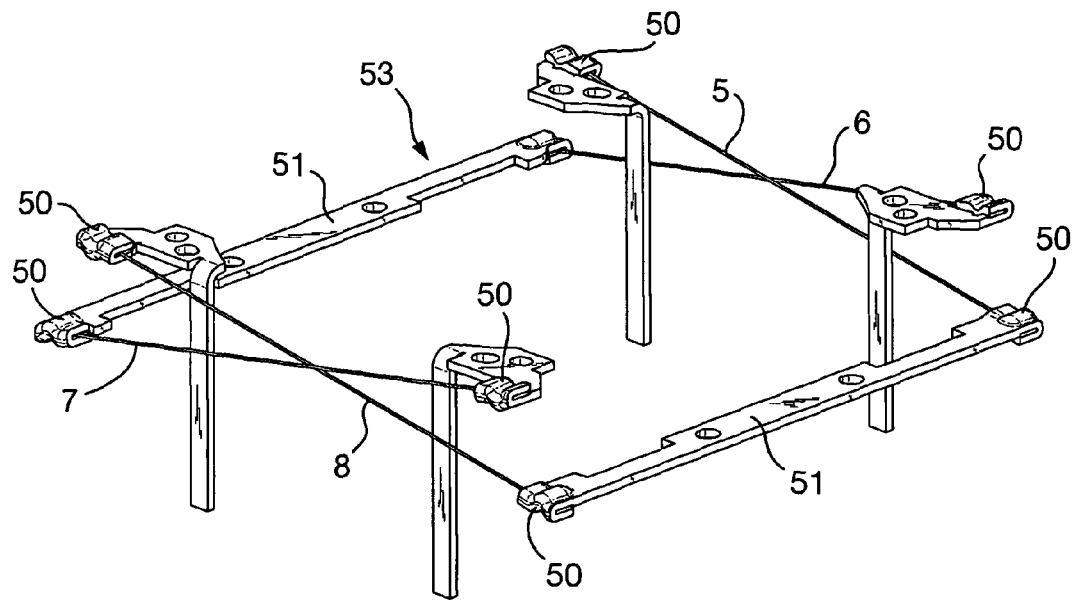
FIGS. 17 and 18 are perspective views of sub-assemblies in FIG. 14.
Figure 18:
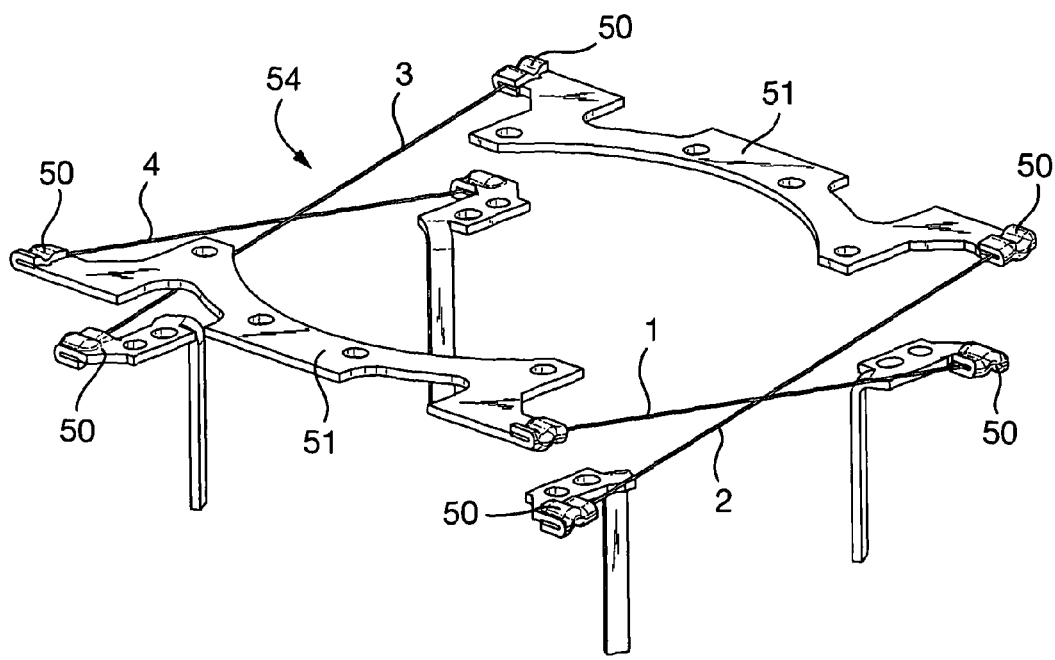

The second construction is similar to the first construction except that the arrangement of the crimping members 50 is adapted to simplify the manufacture of this relatively complex structure. In particular, the SMA actuator wires 1-8 and the crimping members 50 are arranged into two separate sub-assemblies 53 and 54 as shown in FIGS. 17 and 18. The crimping members 50 of each sub-assembly 53 and 54 are arranged so that they are appropriately positioned relative to each other, and then the SMA actuator wires 1-8 are crimped between appropriate pairs of crimping members 50. The crimping members 50 are supported in their appropriate positions during the crimping process. This may be achieved through the aid of one or more frets that are formed from the same material as the crimping members 50, which are then subsequently removed later in the assembly process. Alternatively, this may be achieved by using assembly jigs to position the crimping members 50.

Figure 19:
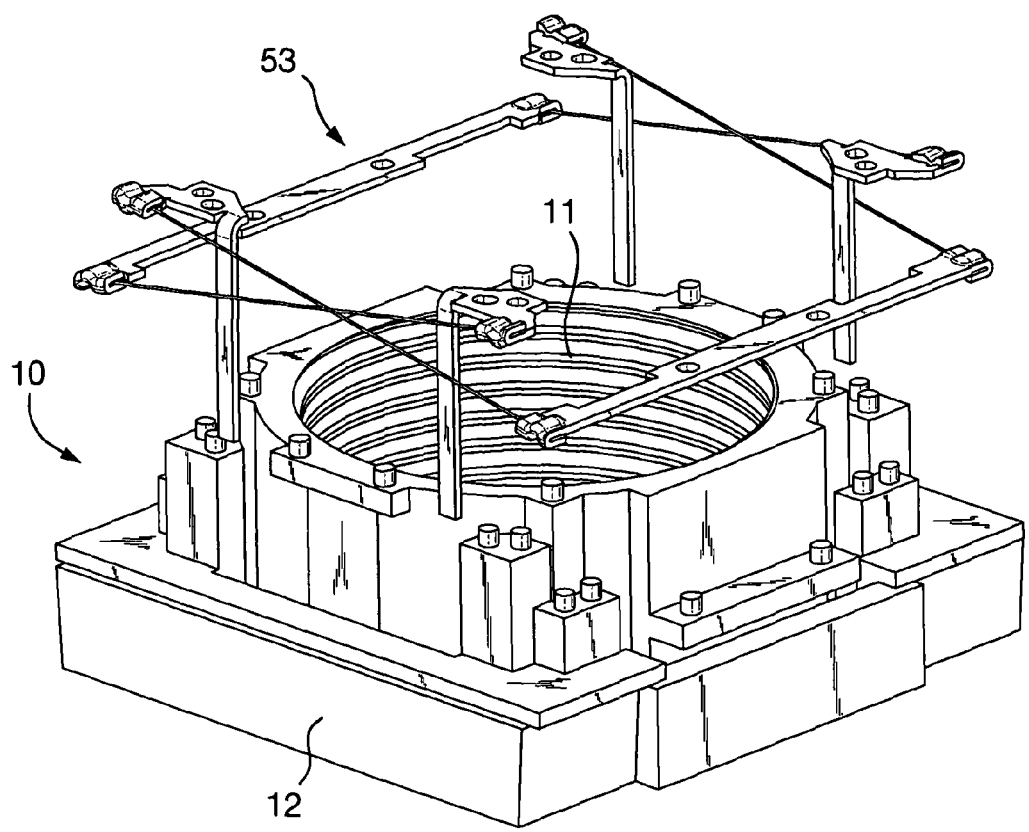
FIGS. 19 and 20 are perspective views of assembly of the sub-assemblies of FIGS. 17 and 18.
Figure 20:
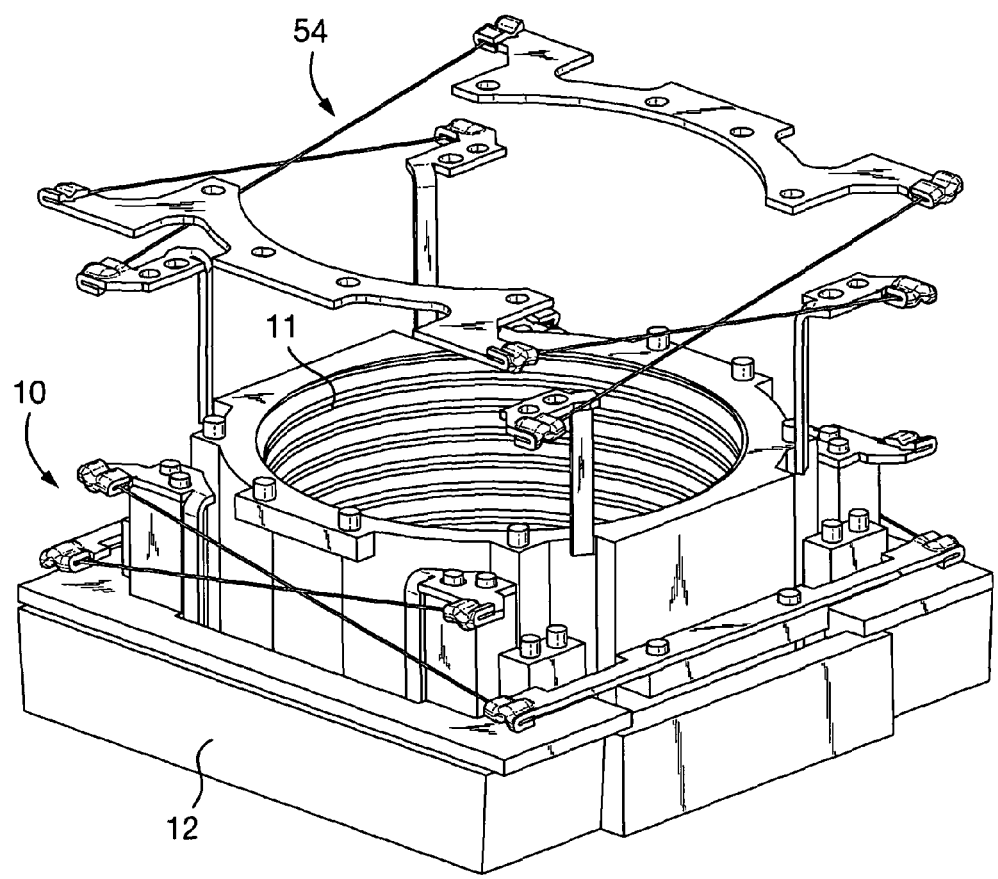

However the sub-assemblies 53 and 54 are supported, the arrangement allows each sub-assembly 53 and 54 to be manipulated and positioned on the SMA actuator apparatus as a single component after the SMA actuator wires 1-8 are crimped to it. In particular, FIG. 19 shows the first sub-assembly 53 being assembled onto the movable element 11 and support structure 12. Thereafter the crimping members 50 of the first sub-assembly 53 are joined to the movable element 11 and support structure 12. FIG. 20 shows the second sub-assembly 54 being subsequently assembled, the arrangement preventing clashing with the first sub-assembly 53. Thereafter the crimping members 50 of the second sub-assembly 53 are joined to the movable element 11 and support structure 12. During this assembly, the movable element 11 and support structure 12 are supported, for example by a jig (not shown).

There is an additional aspect of the present invention associated with the sensing of the various tilts and vibrations. Current systems employ two-axis gyroscopes to sense the induced camera shake. In addition, it may be appreciated that if tilts around the optical axis are also compensated for, a three-axis gyroscope is required. Such gyroscopes are relatively expensive and take up considerable space. Therefore, it is highly desirable to eliminate the need for such gyroscopes. One option considered in a previous filing is to make use of the SMA wire and the camera to provide its own tilt sensor, since it is possible to assess both the position and tension in the SMA wire by monitoring the electrical resistance and electrical power applied to the SMA wire.

As a thought experiment, consider that what is required is that the camera remains stationary, whilst the support structure undergoes a base excitation. Therefore, one way of considering the system is as a vibration isolator. This could be achieved by mounting the camera on very compliant mounts, such that the resonant frequencies of the camera on the mounts in the various degrees of freedom are very low. For frequencies below 1 Hz (say) that system should be relatively stiff, so that the user can pan the camera around, however, for higher frequencies it should be compliant.

Typically, if one of the SMA actuator wires 1-8 is required to maintain a length, any external force will tend to stretch it, which the controller will answer by more applying electrical power to contract the SMA wire and hence maintain electrical resistance and hence length.

It can be seen, that if instead the controller is configured such that it is slow to react, so that for excitations below 1 Hz the SMA wire still looks 'stiff', but for higher frequencies it effectively looks like a constant electrical power is applied, the SMA wire will appear less stiff at higher frequencies.

Such a configuration is unlikely to produce an OIS system with acceptable performance. However, if the controller is configured to actively reduce the power in response to an excitation which stretches the wire, and the positive feedback is made frequency dependent, it may be seen that the SMA OIS system could achieve the vibration suppression performance without the need of separate gyroscope sensors.

Another way to consider such a system is to operate the SMA wires as delivering pseudo-constant force devices. Such a system either requires separate highly accurate force sensors on each wire, or requires highly accurate measures of resistance and power applied to each wire so as to control to effectively constant force.

The invention claimed is:

1. An SMA actuation apparatus comprising:
a support structure;
a movable element supported on the support structure in a manner allowing movement of the movable element relative to the support structure; and
eight SMA actuator wires inclined with respect to a notional primary axis with two SMA actuator wires on each of four sides around the primary axis, the SMA actuators being connected between the movable element and the support structure so that on contraction two groups of four SMA actuator wires provide a force on the movable element with a component in opposite directions along the primary axis, the SMA actuator wires of each group being arranged with 2-fold rotational symmetry about the primary axis.

2. An apparatus according to claim 1, wherein the movable element is a camera unit comprising an image sensor and a camera lens element arranged to focus an image on the image sensor, the primary axis being the optical axis of the camera lens element.

3. An apparatus according to claim 1, wherein the SMA actuation apparatus is a camera apparatus further comprising an image sensor fixed to the support structure, and the movable element comprises a camera lens element arranged to focus an image on the image sensor, the primary axis being the optical axis of the camera lens element.

4. An apparatus according to claim 1, wherein the eight SMA actuator wires have electrical connections that allow each of the SMA actuator wires to receive an independent drive signal.

5. An apparatus according to claim 1, further comprising a control circuit electrically connected to the SMA actuator wires for supplying drive signals thereto.

6. An apparatus according to claim 5, wherein the control circuit is arranged to supply each of the SMA actuator wires with an independent drive signal.

7. An apparatus according to claim 5, further comprising a vibration sensor arranged to generate output signals representative of the vibration of the apparatus, the control circuit being arranged to generate the drive signals in response to output signals of vibration sensor for stabilising the image sensed by the image sensor.

8. An apparatus according to claim 7, wherein
the movable element is a camera unit comprising an image sensor and a camera lens element arranged to focus an image on the image sensor, the primary axis being the optical axis of the camera lens element, and
the control circuit is arranged to generate drive signals that cause the camera unit to tilt and to move laterally relative to said optical axis for stabilising the image sensed by the image sensor.

9. An apparatus according to claim 7, wherein
the SMA actuation apparatus is a camera apparatus further comprising an image sensor fixed to the support structure, and the movable element comprises a camera lens element arranged to focus an image on the image sensor, the primary axis being the optical axis of the camera lens element, and
the control circuit is arranged to generate drive signals that cause the movable element to move laterally relative to said optical axis for stabilising the image sensed by the image sensor and to move along the optical axis for changing the focus of the image.

10. An apparatus according to claim 1, wherein each group of four SMA actuator wires comprises two pairs of SMA actuator wires on opposite sides.

11. An apparatus according to claim 10, further comprising, on each side of the movable element, a pivotal member pivotally connected to the movable element, the two SMA actuator wires on each side being connected to the pivotal member.

12. An apparatus according to claim 1, wherein each group of four SMA actuator wires comprises one SMA actuator wire on each side.

13. An apparatus according to claim 12, further comprising a control circuit electrically connected to the SMA actuator wires for supplying drive signals thereto, wherein the control circuit is arranged to supply the SMA actuator wires on opposite sides that are parallel to each other with a common drive signal.

14. An apparatus according to claim 1, wherein on each side the two SMA actuator wires are parallel to one another or are inclined in opposite senses with respect to each other and cross.

15. An apparatus according to claim 1, wherein the two SMA actuator wires that are on each side are each perpendicular to the same notional lateral axis that is perpendicular to the primary axis.

16. An apparatus according to claim 1, wherein the movable element is supported on the support structure solely by the SMA actuator wires.

17. An apparatus according to claim 1, wherein the movable element comprises a camera lens element that includes one or more lenses having a diameter of at most 10 mm.

* * * * *